(12) United States Patent
Birk

(10) Patent No.: US 12,468,186 B2
(45) Date of Patent: Nov. 11, 2025

(54) METHOD AND SIGNAL GENERATOR FOR CONTROLLING AN ACOUSTO-OPTIC ELEMENT

(71) Applicant: Leica Microsystems CMS GmbH, Wetzlar (DE)

(72) Inventor: Holger Birk, Meckesheim (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 307 days.

(21) Appl. No.: 16/607,367

(22) PCT Filed: Apr. 25, 2018

(86) PCT No.: PCT/EP2018/060564
§ 371 (c)(1),
(2) Date: Oct. 23, 2019

(87) PCT Pub. No.: WO2018/197546
PCT Pub. Date: Nov. 1, 2018

(65) Prior Publication Data
US 2020/0050029 A1 Feb. 13, 2020

(30) Foreign Application Priority Data
Apr. 25, 2017 (DE) ...................... 10 2017 108 854.7

(51) Int. Cl.
*G02F 1/11* (2006.01)
*G02F 1/33* (2006.01)
(52) U.S. Cl.
CPC .............. *G02F 1/113* (2013.01); *G02F 1/116* (2013.01); *G02F 1/33* (2013.01)

(58) Field of Classification Search
CPC ... G02F 1/00; G02F 1/11; G02F 1/113; G02F 1/116; G02F 1/33; G02F 1/335;
(Continued)

(56) References Cited

U.S. PATENT DOCUMENTS

| 5,255,257 A | 10/1993 | Bryant et al. |
| 2002/0039053 A1 | 4/2002 | Su et al. |

(Continued)

FOREIGN PATENT DOCUMENTS

| CN | 102004333 A | 4/2011 |
| DE | 102007053199 A1 | 5/2009 |

(Continued)

OTHER PUBLICATIONS

Murphy et al "Ask the Application Engineer—33; All About Direct Digital Synthesis"; Analog Dialogue 38-08, (Aug. 2004), pp. 1-5. (Year: 2004).*

(Continued)

*Primary Examiner* — Jie Lei
(74) *Attorney, Agent, or Firm* — LEYDIG, VOIT & MAYER, LTD.

(57) ABSTRACT

A method for actuating an acoustooptical element includes generating an actuation signal by a direct digital synthesis (DDS) method using a signal value sequence made up of at least two frequency components. A signal generator for actuating an acoustooptical element is configured to perform the method. An arrangement includes the signal generator and the acoustooptical element. A microscope includes the arrangement.

21 Claims, 5 Drawing Sheets

(58) Field of Classification Search
CPC . G02F 2203/12; G02F 2201/16; G02B 21/00; G02B 21/06; G02B 21/0076; G02B 21/0036
USPC ....... 359/305, 308, 285, 287, 237, 312, 240, 359/290, 298
See application file for complete search history.

(56) References Cited

U.S. PATENT DOCUMENTS

| | | |
|---|---|---|
| 2005/0238276 A1 | 10/2005 | Kump |
| 2006/0269185 A1 | 11/2006 | Noguchi et al. |
| 2007/0153290 A1 | 7/2007 | Steinlechner |
| 2007/0171505 A1 | 7/2007 | Noguchi et al. |
| 2008/0247031 A1 | 10/2008 | Wasilousky |
| 2009/0073544 A1 | 3/2009 | Schweitzer et al. |
| 2009/0289666 A1 | 11/2009 | Kump |
| 2009/0326420 A1 | 12/2009 | Moonen et al. |
| 2010/0232011 A1 | 9/2010 | Volker |
| 2011/0304900 A1* | 12/2011 | Widzgowski ...... G02B 21/0032 359/287 |
| 2017/0242281 A1* | 8/2017 | Leger .................... G02B 21/06 |
| 2018/0231416 A1 | 8/2018 | Roscher et al. |

FOREIGN PATENT DOCUMENTS

| | | | |
|---|---|---|---|
| DE | 102014009142 A1 | 12/2015 | |
| JP | 2002152292 A | 5/2002 | |
| JP | 2007519908 A | 7/2007 | |
| JP | 2009506365 A | 2/2009 | |
| JP | 2010501301 A | 1/2010 | |
| JP | 2014215419 | * 11/2014 | ............... G02F 1/11 |
| WO | WO 2006/134169 A1 | 12/2006 | |
| WO | WO 2011/154501 A1 | 12/2011 | |
| WO | WO 2016/059157 A1 | 4/2016 | |
| WO | WO 2016/075681 A1 | 5/2016 | |

OTHER PUBLICATIONS

English translation of JP 2014215419. (Year: 2014).*
Zhang et al "A novel way for wavelength locking with acousto-optic frequency modulation", Optics Express, vol. 17, No. 12, Jun. 8, 2009. (Year: 2009).*
Zhang et al, "Application of DDS in laser modulation", Proc. of SPIE vol. 6824, 68241Q, (2007); 68241Q-1-68241Q-6. (Year: 2007).*
Hideharu Mikami et al., "Enhanced Speed in Frequency Division Multiplexed Fluorescence Confocal Microscopy," Preprints of the 63rd JSAP Spring Meeting, 21p-S422-8, Japan, JSAP, Mar. 19, 2016, 03-533.
Proklov et al., "High Efficiency Multi-channel Acousto-optic Multiplexers on Anisotropic Light Diffraction by Multi-frequency Sound," 2007 IEEE Ultrasonics Symposium, IEEE, Oct. 28, 2007, pp. 825-828, DOI:10.1109/ULTSYM.2007.211.

* cited by examiner

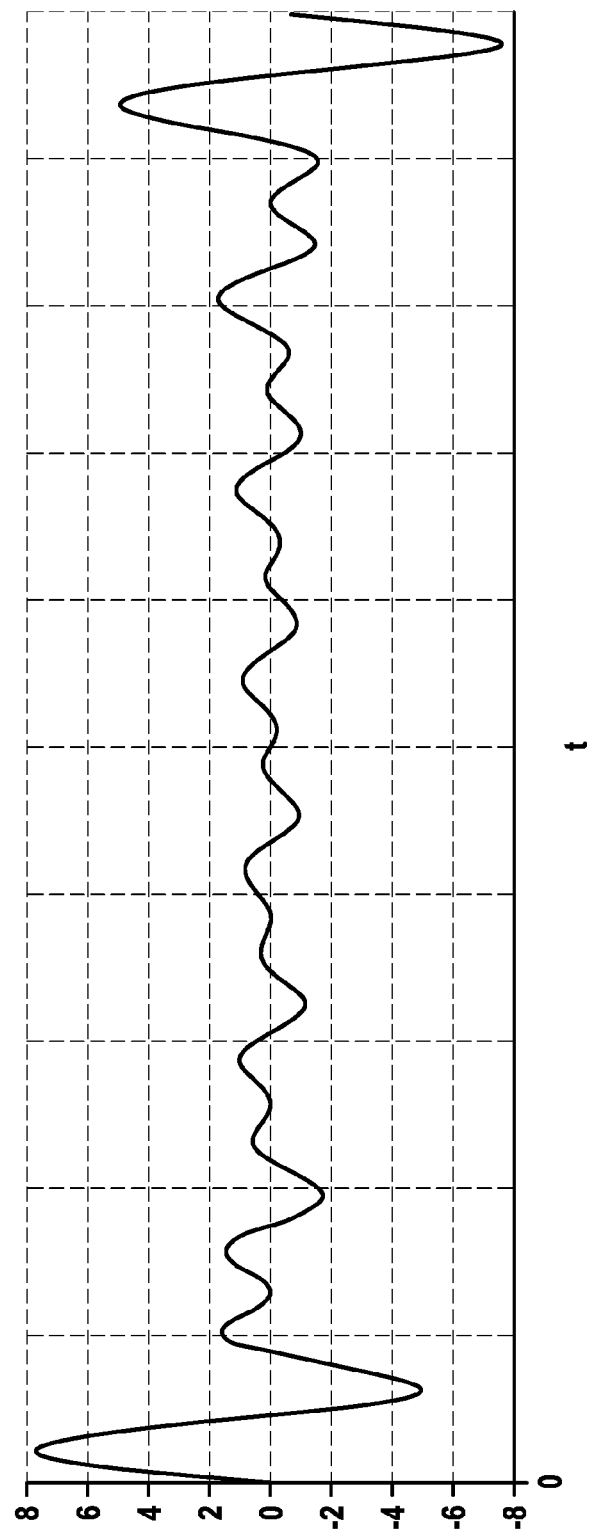

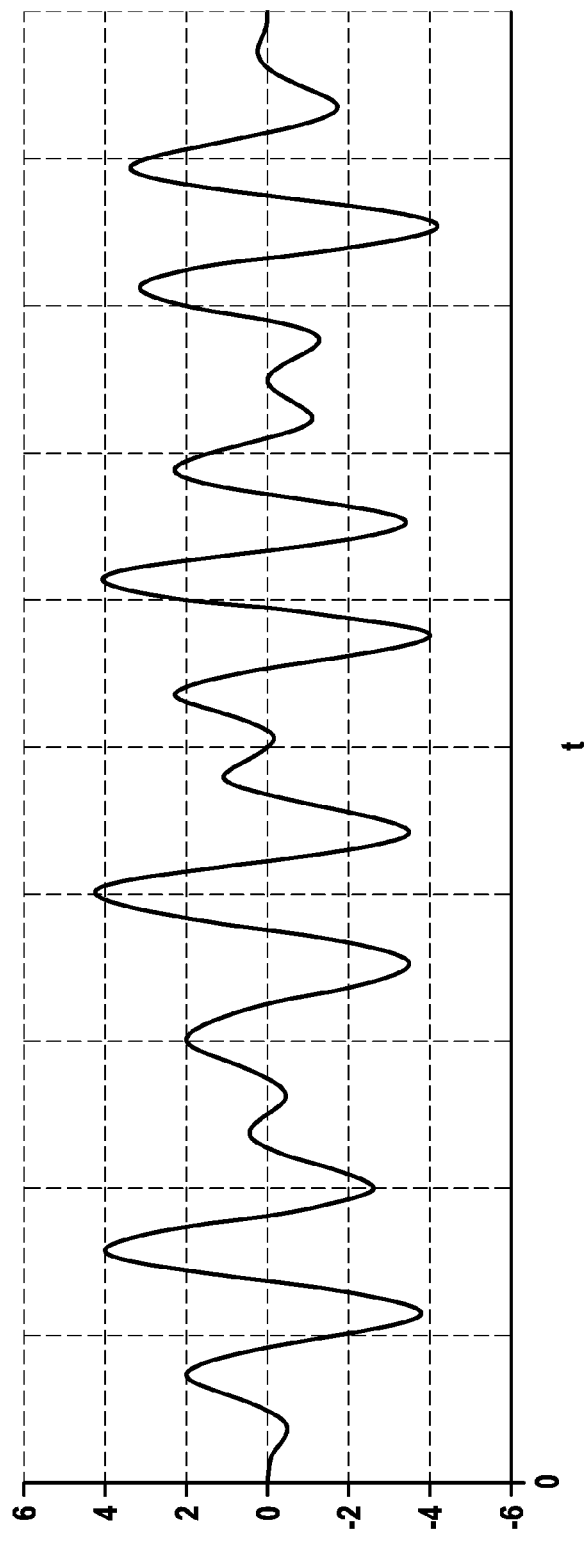

METHOD AND SIGNAL GENERATOR FOR CONTROLLING AN ACOUSTO-OPTIC ELEMENT

CROSS-REFERENCE TO PRIOR APPLICATIONS

This application is a U.S. National Phase Application under 35 U.S.C. § 371 of International Application No. PCT/EP2018/060564, filed on Apr. 25, 2018, and claims benefit to German Patent Application No. DE 10 2017 108 854.7, filed on Apr. 25, 2017. The International Application was published in German on Nov. 1, 2018 as WO 2018/197546 under PCT Article 21(2).

FIELD

The present invention relates to a method and a signal generator for actuating an acoustooptical element, to an arrangement comprising such a signal generator and an acoustooptical element and to a microscope having such an arrangement.

BACKGROUND

A substantial challenge in areas of microscopy is, independently of the method used, providing stimulating light having one or more prescribed wavelengths. Depending on the type of microscopy method and/or the type of the sample, one or more stimulating light beams may be necessary, which as a rule need to have prescribed spectral properties.

By way of example, it is important in the field of fluorescence microscopy to use light having the wavelength that stimulates the fluorescence. Different wavelengths are used in particular when the sample contains fluorescent substances having different stimulating wavelengths.

In the field of confocal scanning microscopy, it is of particular interest to adapt the intensities for specific wavelengths or to switch specific wavelengths on or off.

For this purpose, wavelength-selective elements can be used that are based on the acoustooptical effect. Acoustooptical elements of this kind normally have what is known as an acoustooptical crystal that is set oscillating by means of an acoustic signal transmitter, also referred to as a transducer. As a rule, such a transducer has a piezoelectric material and two or more electrodes making contact with this material. By electrically connecting radio frequencies (RF), which are typically in the range between 10 MHz and 10 GHz, to the electrodes, the piezoelectric material is stimulated to oscillate, so that an acoustic wave can be produced that passes through the crystal. Acoustooptical crystals are distinguished in that the soundwave produced alters the optical properties of the crystal.

Examples of acoustooptical elements of this kind are acoustooptical tunable filters (AOTF), acoustooptical modulators (AOM), acoustooptical deflectors (AOD), acoustooptical beam splitters (AOBS) and acoustooptical beam mergers (AOBM).

A particular challenge when using acoustooptical elements is actuating them. The radio-frequency electrical signals for the transducer are usually generated in a frequency generator (for example a voltage-controlled oscillator (VCO), in a phase-locked loop (PLL), or in a synthesizer in accordance with the DDS (direct digital synthesis) method and boosted by means of a radio-frequency amplifier such that the amplitude is large enough to set the crystal oscillating. When multiple different actuation frequencies are applied at the same time, light beams at multiple wavelengths can be deflected at the same time (for example in the case of an AOTF, AOBS, AOBM, AOM) or a wavelength of an incident light beam can be deflected into multiple light beams having different directions at the same time (for example in the case of an AOD).

To generate an actuation signal at multiple frequencies, single frequency generators, e.g. DDS synthesizers, which each generate e.g. a sinusoidal signal, can be combined, e.g. by means of analog mixing of the output signals. Alternatively, digital superposition is also possible, as shown e.g. in WO 2011/154501 A1. An exemplary DDS synthesizer is depicted in FIG. 1.

When multiple actuation frequencies are used at the same time, nonlinearities in the amplifier, transducer, crystal or other energy exchange between the actuation frequencies mean that beats or intensity fluctuations are always also obtained, these being able to arise at all of the difference and summed frequencies. Particular disturbance is caused in this case by modulations of the diffracted light on the basis of (low) difference frequencies, which can then also lead to undesirable modulations of the measurement or useful signal derived from the diffracted light. One consequence is stripy patterns in the image, for example.

An additional problem when actuating an acoustooptical element arises as a result of the temperature-dependent speed of sound in the acoustooptical crystal. If the crystal temperature is not kept at a constant value or the frequencies of the actuation signal are not corrected as appropriate, the diffraction pattern moves. Frequency correction is dealt with e.g. in DE 10 2007 053 199 A1. However, frequency correction in the case of mixed signals is extremely sophisticated, since the difference and summed frequencies change.

SUMMARY

In an embodiment, the present invention provides a method for actuating an acoustooptical element includes generating an actuation signal by a direct digital synthesis (DDS) method using a signal value sequence made up of at least two frequency components.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2a shows a signal form having multiple frequency components in accordance with a preferred embodiment of the invention.

FIG. 2b shows a signal form having multiple frequency components in accordance with a preferred embodiment of the invention with an adapted phase ratio.

DETAILED DESCRIPTION

Figure 1:
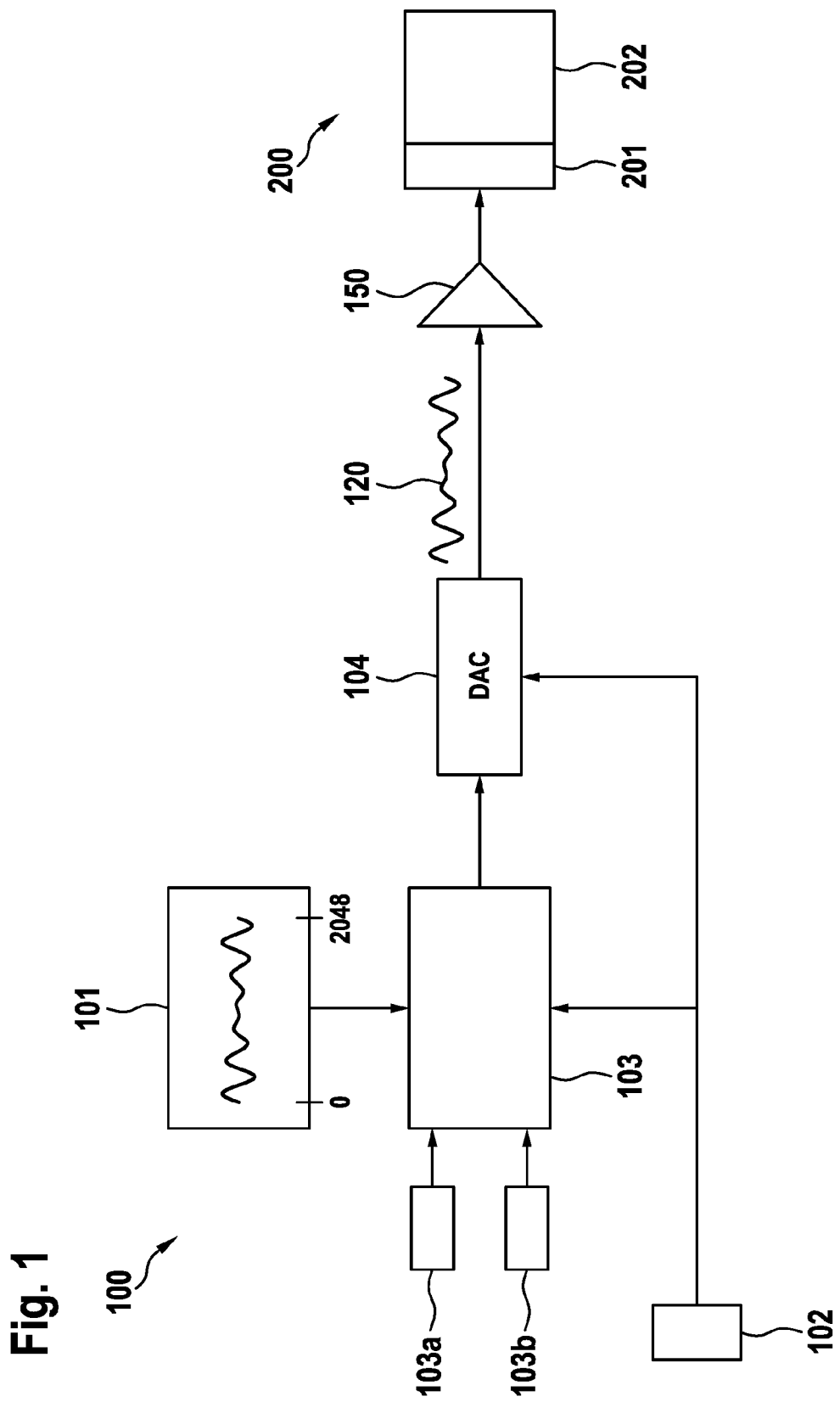
FIG. 1 shows a schematic depiction of a DDS synthesizer with a signal form having multiple frequency components in accordance with a preferred embodiment of the invention.

It is desirable to operate acoustooptical elements with an overlay of multiple actuation frequencies. In this case, the aim is for undesirable beats in the intensity of the diffracted light to be minimized.

According to embodiments of the invention, a method and a signal generator for actuating an acoustooptical element, an arrangement comprising such a signal generator and an acoustooptical element, and a microscope having such an arrangement are provided.

An embodiment of the invention is based on the measure that an actuation signal for the acoustooptical element is generated by means of a DDS method by means of a signal value sequence made up of at least two frequency components. The signal value sequence therefore already contains the desirable frequency combination of two or more frequencies for the actuation signal. The implementation in terms of equipment in a signal generator or DDS synthesizer then results in this signal value sequence being saved in a memory device, for example in the form of a table.

It is advantageous in this case that the signal generation is based on only one signal value sequence, which also stipulates the difference frequencies between the frequency components. In order to perform temperature tracking, for example, it is only necessary for the DDS phase increment to be adapted. The frequencies are automatically corrected consistently, as a result of which the difference frequencies are also corrected as appropriate.

The signal value sequence is preferably made up of integer periods of each frequency component. By way of example, the signal value sequence could be the overlay of three frequency components, with 10 periods of a component at a first frequency, 11 periods of a component at a second frequency and 12 periods of a component at a third frequency being overlaid. This example must naturally not be understood in a restrictive fashion. Any desired other combination of frequency components is also possible. It is merely important that integer periods of the different frequency components are overlaid. If, in this example, the signal value sequence is now swept by means of a phase increment, the frequency ratios among one another are maintained independently of the actual size of the phase increment.

In one advantageous embodiment, the signal value sequence is made up of at least three frequency components, of which at least one pair of two frequency components is at the same frequency interval from one another as another pair of two frequency components. This permits beats to be eliminated, as will be explained later on. If, as a further preference, the signal value sequence is made up of an uneven number of frequencies, beat elimination is particularly simple, since two respective frequency differences can always cancel one another out. For this case, each even number, in particular two, of pairs of two frequency components is ideally at the same frequency interval from one another.

In a further advantageous embodiment, the phase of at least one, preferably of each, of the frequency components is prescribed at a specific time in order to alter a maximum in the signal value sequence. In particular, the time is characterized by the first signal value, which means that the phase can also be referred to as a starting phase. Any alteration in a starting phase [0° to 360°] of one of the frequency components leads in the overlay to a different signal value sequence having different maxima and minima. Advantageously, at least one starting phase is now prescribed such that the maximum value of the signal value sequence becomes as low as possible or minimal. This is advantageous because fewer nonlinearities and beats are observed the lower the maximum values are.

In a further advantageous embodiment, a phase increment is prescribed for sweeping the signal value sequence on the basis of a temperature of a crystal of the acoustooptical element. As explained, an alteration in the phase increment leads to an alteration in the frequencies in the actuation signal. Such temperature tracking of the frequency can be performed particularly well in the case of the method according to an embodiment of the invention, since only the phase increment needs to be adapted in order to match all of the frequency components to the new temperature circumstances.

Preferably, the frequency components are prescribed such that the signal form is repeated after a time less than or equal to a threshold value. This is advantageous because beat effects have no disadvantageous effect, such as for example a stripy pattern in the image, when the threshold value is low enough.

Expediently, the threshold value is 250 ns. This is advantageous because, with a light beam diameter of e.g. 1 mm and a speed of sound of 4000 m/s, the whole signal form repeats after no later than 250 ns. The light beam thus always "sees" the complete, repeating grating portion.

Although, according to an embodiment of the invention, an actuation signal is already based on a signal value sequence having multiple frequency components, it may nevertheless be expedient to overlay multiple such actuation signals generated according to an embodiment of the invention, in particular by means of digital superposition.

In principle, the concept of digital superposition of multiple DDS output signals allows multiple frequencies to be generated at exactly known difference and summed frequencies. To this end, all signal generators should be driven by the same clock generator. If the aim is in particular to realize multiple frequencies at exactly the same frequency interval, the phase increments of the individual output frequencies should be at the same interval from one another. The whole signal form is repeated in this case after the time provided by the highest common factor (hcf) of the individual phase increments.

An embodiment of the invention can be used particularly preferably to adjust, in particular increase, a bandwidth of the acoustooptical element and/or to produce multiple illumination points from an illuminating light illuminating the acoustooptical element, as will be explained more accurately later on. The position of the illumination points can be altered in particular by the phase increment in this case.

A bandwidth of an acoustooptical element (at one or more prescribed radio frequencies applied to the transducer of the crystal) in respect of the wavelength spectrum of the radiated (wideband) light within the context of the invention must be understood to mean the spectral width of the wavelength subrange of the radiated light in which the acoustooptical element diffracts this radiated light in the 1st order of diffraction to produce a specific set intensity component. Such a definition of the width can be provided for example based on the full width at half maximum (FWHM) of the resultant intensity characteristic of the light diffracted in the 1st order of diffraction. Essentially, the intensity characteristic corresponds to that of a bandpass filter.

The bandwidth thus obtained for an acoustooptical element varies with the radio frequency or frequencies applied to the transducer of the crystal.

It goes without saying that the features cited above and those yet to be explained below are usable not only in the respectively indicated combination but also in other combinations or on their own in different embodiments of the present invention.

FIG. 1 schematically shows a signal generator in the form of a DDS synthesizer 100 in accordance with a preferred embodiment of the invention.

The DDS synthesizer 100 is used to actuate an acoustooptical crystal 202 of an acoustooptical element 200. The acoustooptical element 200 additionally has a piezoelectric transducer 201 for setting the crystal 202 in mechanical oscillation.

The DDS synthesizer 100 has in particular an, in particular adjustable, amplifier 150 connected downstream of it that is used to boost an analog output signal 120 output by the DDS synthesizer 100.

The DDS synthesizer 100 has a memory device 101 storing a signal value sequence, for example in the form of a list or table containing signal values. The signal value sequence has a number of signal values (i.e. numerical values), e.g. in the form of intensity values, that describes the signal form needing to be output for the output signal 120. By way of example, the signal value sequence can comprise 2048 signal values that together form one period of the signal form to be output. In accordance with the depicted preferred embodiment of the invention, the signal value sequence is made up of two frequency components. In the present example, this is the overlay of two sinusoidal oscillations having for example a frequency ratio of 5:6.

Furthermore, the DDS synthesizer 100 has a clock generator 102 that provides a clock signal at a fixed frequency, in the example 500 MHz. This clock signal is used to drive an interpolator 103 and a digital-to-analog converter (DAC) 104. The clock signal is expediently tuned to a maximum clock of the DAC 104 or at least does not exceed said clock.

The interpolator 103 is provided with a phase increment 103*a* and a phase space 103*b*.

The phase space 103*b* comprises a number of phase values (in this case for example $2^{36}$) that define an address space for the values to be output. The number of phase values should expediently be a multiple of the number of signal values, this multiple defining the maximum frequency resolution of the output signal.

The phase increment is used by the interpolator 103 to increase a phase count value in each case in accordance with the clock. If the phase increment is $2^{32}$ as in the present example, the phase space is swept with $2^{36}$ phase values in $2^4=16$ steps.

For each step, the interpolator 103 ascertains a signal value, in the present example every 2048/16=128th, and transfers said signal value to the DAC 104. If necessary, the interpolator 103 can also determine the signal value to be transferred by means of interpolation from the stored signal values.

The DAC 104 outputs the respective signal value in accordance with the clock and in this manner generates the analog output signal 120.

The frequency f of the output signal 120 is obtained as the product of the output frequency $f_{DAC}$ of the DAC 104 and the quotient of the phase increment [103*a*] and the phase space size [103*b*], $$f = \frac{f_{DAC} \cdot [103a]}{[103b]}$$

i.e. in the present example to produce 500 MHz*$(2^{32}/2^{36})$= 500 MHz/16.

In accordance with an embodiment of the present invention, the stored signal value sequence is made up of multiple frequency components, as explained. By way of example, the signal value sequence could contain an overlay of three frequencies, so that 10 periods at a first frequency, 11 periods at a second frequency and 12 periods at a third frequency are overlaid. If the signal value sequence is now swept by means of the phase increment 103*a*, three frequencies are output at the same time.

If temperature fluctuations now mean that adaptation of the frequencies or of the phase increment is required, the "ideal" frequency ratios persist and the entire curve shape is repeated again after the signal value sequence is swept, in which case precisely the 10 periods of the first frequency component, 11 periods of the second frequency component and 12 periods of the third frequency component have been swept.

A maximum beat period duration T is then obtained as $$T = \frac{[103b]}{f_{DAC} \cdot [103a]}.$$

Therefore, a value T, resulting from the frequency ratios of the signal value sequence, is obtained for all values of the phase increment. If need be, the size of the signal value sequence and also of the phase space needs to be increased in comparison with a sinusoidal signal value sequence in order to obtain a desirable temporal resolution. The phase increment needs to be adapted in this case, since a complete sweep of the DDS table now results in multiple periods being output, of course.

If the aim is for example to output three frequencies in the ratio 10/11/12 (for the sake of simplicity 10 MHz, 11 MHz and 12 MHz), the following parameters would be chosen for a conventional design having three separate DDS synthesizers:

Phaseincrement1=1374389530
Frequency1=9.9999999656574800610542297363281e+6
Phaseincrement2=1511828483
Frequency2=1.0999999962223228067159652709961e+7
Phaseincrement3=1649267436
Frequency3=1.1999999958788976073265075683594e+7

If the aim now is to increase all frequencies uniformly, e.g. on account of a temperature change, then the next possible combination is:

Phaseincrement1=1374389540
Frequency1=1.0000000038417056202888488769531e+7
Phaseincrement2=1511828494
Frequency2=1.1000000042258761823177337646484e+7
Phaseincrement3=1649267448
Frequency3=1.2000000046100467443466186523438e+7

If there is additionally a desire to retain the phase ratio during continuous DAC output, then the change in all the phase increments needs to take place at the same time, i.e. in a period $1/f_{DAC}$.

By contrast, if a frequency change is desired within the context of an embodiment of the invention, only one phase increment needs to be changed.

Figure 3:
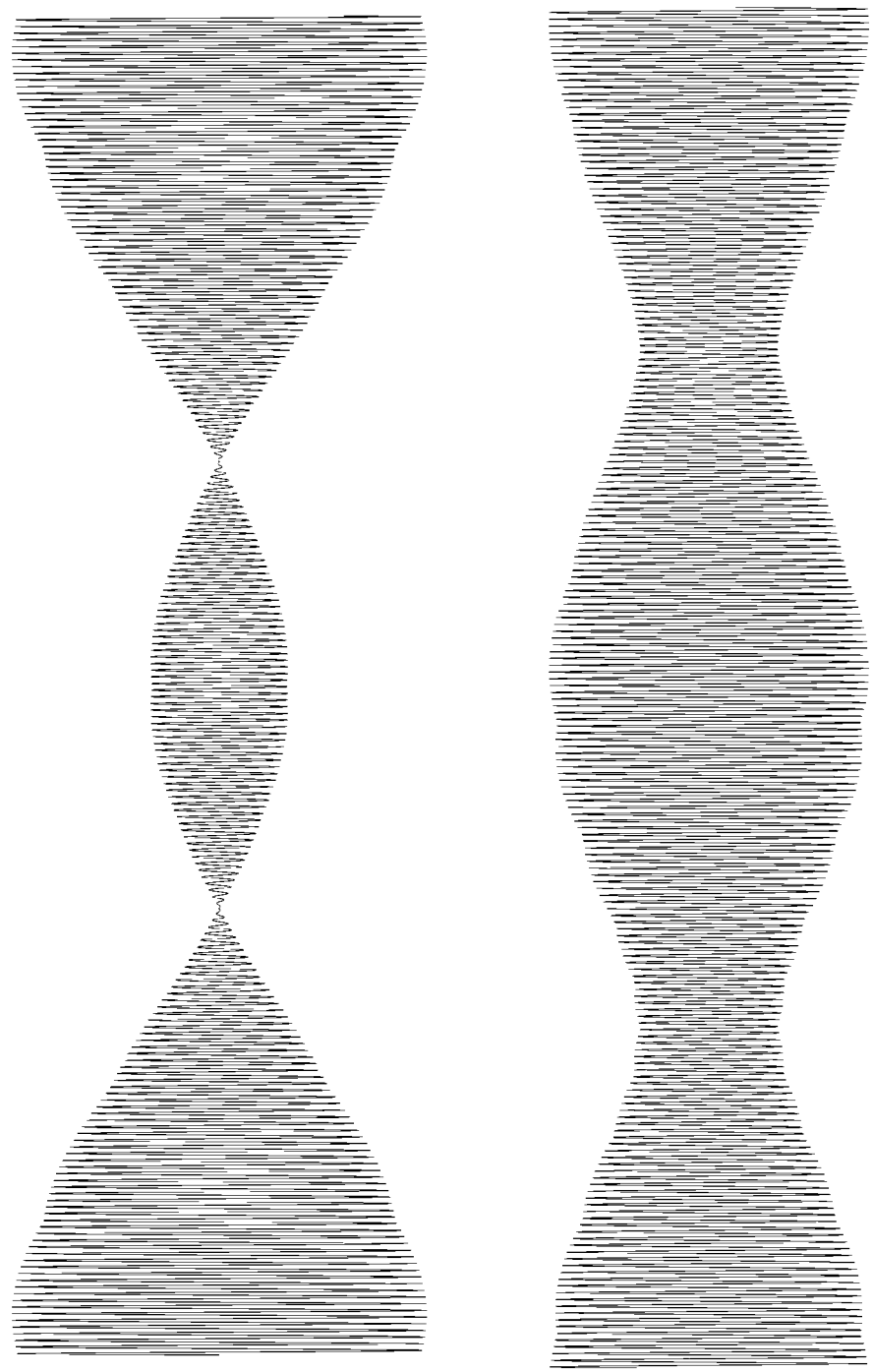
FIG. 3 shows a signal form having multiple frequency components in accordance with a preferred embodiment of the invention once with and once without an adapted phase ratio.

Whereas this simple example—albeit with difficulty—can still be depicted with an arrangement having separate DDS synthesizers, this is almost impossible to do in the case of more complex curve shapes, as shown in FIGS. 2 and 3. In order to retain an arbitrary curve shape and to change the frequency during DAC output, separate DDS synthesizers would require all of the frequency components occurring to be analyzed (e.g. by means of FFT) and then all of the phase increments to be set again in $1/f_{DAC}$ in accordance with the permitted step sizes. The number of DDS synthesizers required corresponds to the number of frequency components in such a case that is not in accordance with an embodiment of the invention.

The solution according to an embodiment of the invention, on the other hand, requires only one new value of the phase increment even for this.

In a development of an embodiment of the invention that is now explained with reference to FIGS. 2*a*, 2*b* and 3, the phase of the individual frequency components is preferably prescribed or optimized such that the signal values occurring as a maximum are as low as possible. The lower the maximum values, the fewer nonlinearities and beats are observed.

FIG. 2*a* shows a signal made up of eight frequencies from 40 MHz to 75 MHz at an identical frequency interval of 5 MHz, in each case with the same amplitude at value 1. At the time zero, all frequency components begin with a sine wave without a phase shift. This results in a maximum amplitude that is only slightly less than the sum of the individual amplitudes (in this example just below 8).

By contrast, in accordance with FIG. 2*b*, suitable phase shifts between the frequencies at the time 0 have been prescribed, known as starting phases. The frequency component at 40 MHz starts at the time 0 with a phase shift of 0°, 45 MHz with 270°, 50 MHz with 90° (i.e. as a cosine signal), 55 MHz with 180°, 60 MHz with 180°, 65 MHz with 90°, 70 MHz with 270° and 75 MHz with 0°.

Although the signal is made up of the same frequency components and the same amplitudes as in FIG. 2*a*, the maximum deflection in this case is barely greater than 4. If it is assumed that nonlinearities cause the beats, then the optimization of the starting phases makes a significant contribution to reducing the beats.

Merely in exemplary fashion, two application options for embodiments of the present invention will be cited below.
Application 1: Production of Multiple Illumination Points (Multispots).

To produce multiple illumination points and/or focal regions in an illumination beam path of a microscope, an actuation signal 120 having multiple frequency components can be applied to an AOD as an acoustooptical element 200 at which the illuminating light is refracted. By way of example, the actuation signal can be made up of eight frequency components from 40 MHz to 75 MHz at an identical frequency interval of 5 MHz.

As a result of the definition of a signal value sequence at all the applicable frequencies, the diffraction intensities of the light for all eight spots remain constant over time. An alteration in the phase increment leads to an even spread of all eight beams, so that it is either possible for temperature effects to be compensated for or else for the image field or the zoom factor to be adjusted.

Application 2: Bandwidth Increase in the Case of the White-Light Laser.

In the case of an AOTF as acoustooptical element 200, the bandwidth for sinusoidal actuation is provided by the crystal geometry and the size of the piezoelectric transducer 201. The spectral profile of the diffraction efficiency is described substantially by a sinc function. If a 2nd frequency is now applied that is within or close to the bandwidth, it should be expected that the bandwidth increases in accordance with a second, spectrally somewhat shifted sinc function as a result. In the case of illumination with white light, a greater portion of the spectrum is then diffracted. Such a method is described in the application DE 10 2014 009 142 A1. However, this document does not discuss a second applied frequency within the bandwidth leading to particularly disturbing beat effects. If the two frequencies differ by less than 1 MHz, for example, then the beat duration is above 1 µs. This is a typical recording time for an image point, however. That is to say that when two closely adjacent frequencies are simply overlaid, the beat is clearly visible at any rate.

One approach to a solution is now to overlay an uneven number of frequencies, e.g. three, such that each even number (preferably two) of pairs of two frequencies is at the same frequency interval from one another. Suitable choice of the starting phases then allows the effect to be achieved that the beat arising from the difference between frequency_1 and frequency_2 is out of phase with the beat arising from the difference between frequency_2 and frequency_3 and the two beats compensate for one another. In this case too, the combination of all frequencies in a single signal value sequence is essential to retain the frequency and phase ratios even in the event of frequency shifts.

A further approach to a solution is to generate almost arbitrary bandwidths for the AOTF by means of suitable, more complex stimulation signals. Fundamentally, all of the possible signal forms are representable by a linear combination of sinusoidal signals of suitable frequency and phase. A square-wave-shaped transmission response is particularly desirable for the AOTF. One approach to achieving this is for example the product of a sinusoidal oscillation and a sinc function. However, it is necessary to ensure that periodic constraints for the signal value sequence are met, i.e. the signal form should be able to be continued without skips or kinks.

Once the signal form necessary for achieving a desired bandwidth profile has been found, it can be moved to different wavelength ranges by simply changing a phase increment.

A further example of an overlay of three frequencies, as might be relevant for application 2, is shown in FIG. 3. In this case, three frequencies in the ratio 100/100.5/101 are overlaid. In the upper image, the starting phase of the central frequency is 0°, and in the lower image it is 90°. In this case too, the effect of the starting phase on the maximum amplitude can clearly be seen. In the lower image, the maximum amplitude is distinctly smaller.

Figure 4:
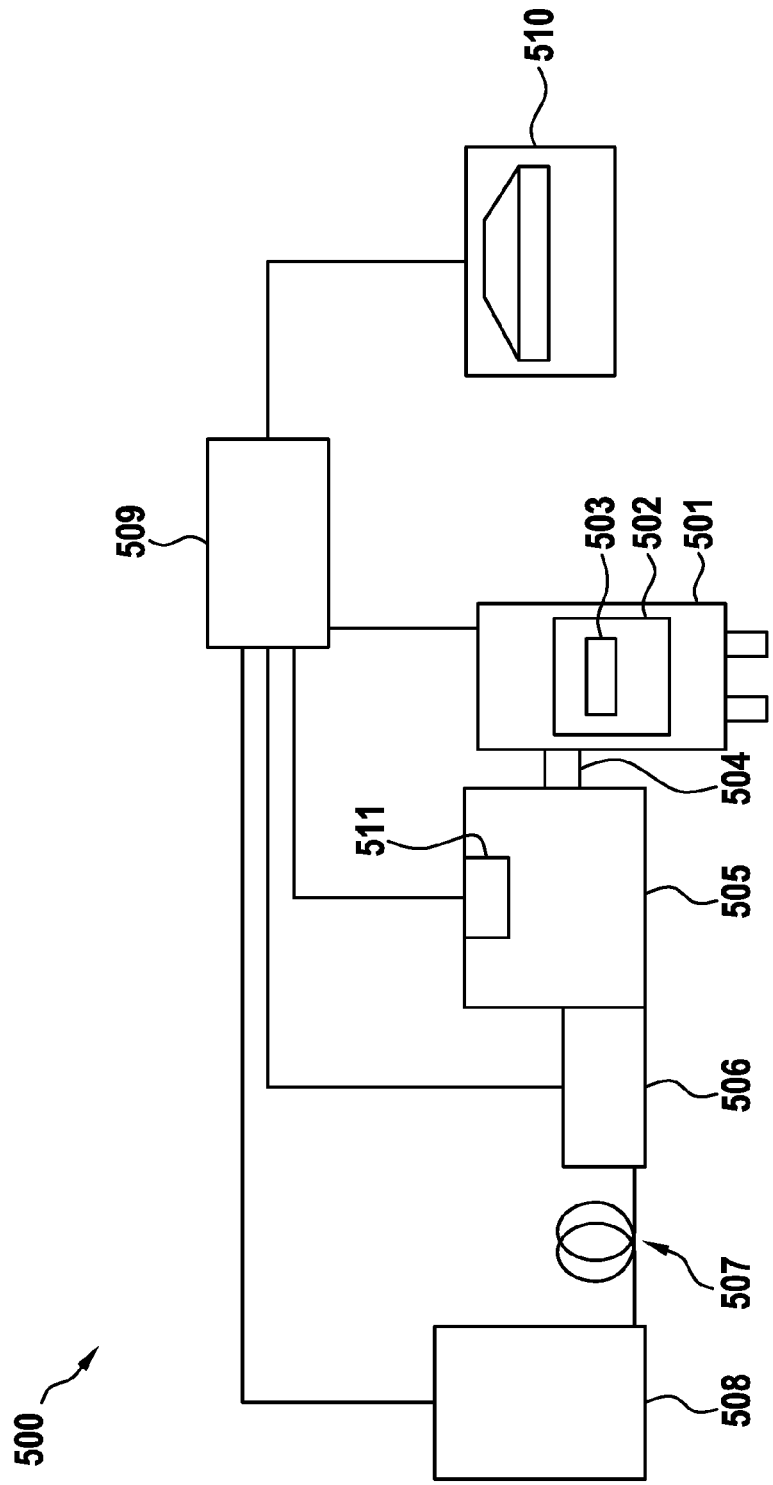
FIG. 4 shows an overview of the typical elements of a confocal microscope in a schematic view.

FIG. 4 schematically shows an exemplary confocal microscope having typical components. 500 denotes the overall system. The confocal scanning and detection unit is denoted by 505. The associated illumination device is denoted by 506. In the illumination device, there is provision for an arrangement as shown in FIG. 1. It is likewise possible for the illumination device 506 to be connected to the scanning and detection unit 505 not directly but rather via an optical fiber.

508 is a laser light source connected to the illumination device 506 via an optical fiber 507. Alternatively, the laser light source 508 can also be connected directly to the illumination device 506. The laser light is influenced in the illumination device 506 by means of an acoustooptical element if desired.

504 denotes an optical adapter for the confocal scanning and detection unit 505 on the microscope stand 501. Inside the stand 501 there is the object platform 502 with a sample 503 to be examined. A control unit 509 is connected to the individual components 508, 506, 505 and 501 by means of appropriate connecting lines. A computer having control and presentation programs is denoted by 510; it too is connected to the control unit 509.

Arranged inside the confocal scanning and detection unit 505, in a first variant, is a conventional confocal beam path designed in a known manner with a single pinhole and a beam scanner, for example a mirror scanner.

In a second variant, there is, inside the confocal scanning and detection unit 505, a beam path in the case of which the sample is illuminated at the same time by means of one or more illumination points, or illumination points expanded in one direction. Accordingly, the photons to be detected are selected for example by means of a geometric arrangement of perforated shutters (pinholes).

The sample 503 to be examined is illuminated by means of a microscope optical system, and mapped by means of the same microscope optical system in particular onto a sensor arrangement 511 that, depending on the embodiment of the confocal scanning and detection unit 505, consists of a photomultiplier or an array of photomultipliers. The way in which a system 500 depicted in FIG. 4 works is sufficiently well known per se and will therefore not be explained in the present case.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Signal generator
101 Memory device
102 Clock generator
103 Interpolator
103a Phase increment
103b Phase space
104 Digital-to-analog converter (DAC)
120 Output signal
150 Amplifier
200 Acoustooptical element
201 Piezoelectric transducer
202 Acoustooptical crystal
500 Microscope system
501 Microscope stand with microscope optical system
502 Object platform
503 Sample
504 Optical adapter
505 Confocal scanning and detection unit
506 Illumination device
507 Illumination fiber
508 Laser light source
509 Control unit
510 Computer with control and presentation programs
511 Sensor arrangement

The invention claimed is:

1. A method for actuating an acoustooptical element, the method comprising:
generating an actuation signal by a direct digital synthesis (DDS) method using a signal value sequence made up of at least two frequency components that are overlaid in the signal value sequence such that the actuation signal contains at least two frequencies that overlap in time.

2. The method as claimed in claim 1, wherein the signal value sequence is made up of integer periods of each of the at least two frequency components.

3. The method as claimed in claim 2, wherein each of the at least two frequency components comprises a respective finite set of signal values, each respective finite set of signal values defining a frequency of a sinusoidal oscillation, and each integer period corresponding to an entirety of each respective finite set of signal values.

4. The method as claimed in claim 1, wherein the signal value sequence is made up of at least three frequency components, and wherein at least one pair of two of the frequency components is at a same frequency interval from one another as another pair of two of the frequency components.

5. The method as claimed in claim 4, wherein each even number of pairs of two of the frequency components is at the same frequency interval from one another.

6. The method as claimed in claim 1, wherein the signal value sequence is made up of an uneven number of frequency components.

7. The method as claimed in claim 1, wherein a phase of at least one of the frequency components is prescribed at a specific time in order to alter a maximum in the signal value sequence.

8. The method as claimed in claim 1, wherein a phase increment is prescribed for sweeping the signal value sequence based on a temperature of a crystal of the acoustooptical element.

9. The method as claimed in claim 1, wherein the frequency components are prescribed such that the signal form is repeated after a time less than or equal to a threshold value.

10. The method as claimed in claim 9, wherein the threshold value is 250 ns.

11. The method as claimed in claim 1, wherein a bandwidth of the acoustooptical element is adjusted.

12. The method as claimed in claim 1, wherein multiple illumination points are produced from an illuminating light illuminating the acoustooptical element.

13. The method as claimed in claim 12, wherein a phase increment is prescribed for sweeping the signal value sequence to prescribe the positions of the illumination points.

14. A signal generator for actuating an acoustooptical element, the signal generator being configured to perform the method as claimed in claim 1.

15. An arrangement comprising at least one signal generator as claimed in claim 14 and an acoustooptical element.

16. The arrangement as claimed in claim 15, wherein the acoustooptical element is one of an acoustooptically tunable filter, an acoustooptical modulator, an acoustooptical deflector, an acoustooptical beam splitter and an acoustooptical beam merger.

17. A microscope having the arrangement as claimed in claim 15.

18. The method as claimed in claim 1, further comprising:
sweeping the signal value sequence by a phase increment using an interpolator such that a frequency ratio between the at least two frequency components is maintained independent of a size of the phase increment.

19. The method as claimed in claim 18, wherein the signal value sequence is stored in a memory device, and wherein the interpolator is driven by a clock generator to output the at least two frequency components to a digital to analog converter.

20. The method as claimed in claim 1, further comprising actuating the acoustooptical element using the actuation signal.

21. The method as claimed in claim 1, further comprising retrieving the at least two frequency components from a table stored in memory, wherein the signal value sequence stored in the table comprises at least a first number of periods at a first frequency overlaid with a second number of periods at a second frequency.

* * * * *